United States Patent [19]

Maska et al.

[11] Patent Number: 5,034,454

[45] Date of Patent: Jul. 23, 1991

[54] WATER REDUCIBLE ACRYLIC WITH SUPERIOR DIP AND FLOW CHARACTERISTICS/LOW VOC

[75] Inventors: Rudolf Maska, Pittsburgh; David T. McKeough, Gibsonia, both of Pa.; David L. Holzinger, New Berlin; Susan D. Klejsmit, Muskego, both of Wis.

[73] Assignee: PPG Industries, Inc., Pittsburgh, Pa.

[21] Appl. No.: 319,437

[22] Filed: Mar. 3, 1989

[51] Int. Cl.$^5$ .................. C08L 33/08; C08L 33/10; C08L 91/06; C08L 91/08
[52] U.S. Cl. .................. 524/763; 524/275; 524/277; 524/279; 524/487; 524/489
[58] Field of Search ............. 524/487, 489, 275, 277, 524/763, 279

[56] References Cited

FOREIGN PATENT DOCUMENTS 57-207631 12/1982 Japan ........................... 524/487

*Primary Examiner*—Allan M. Lieberman
*Attorney, Agent, or Firm*—Dennis G. Millman; Godfried R. Akorli

[57] ABSTRACT

Disclosed herein are crosslinkable water-dispersible acrylic copolymers which are prepared by free-radical initiated polymerization of ethylenically unsaturated monomers containing independently an active hydrogen group, a carboxyl group and a sulfonic group, wherein the polymerization is conducted in the presence of a wax. In combination with curing agents, the crosslinkable compositions are particularly useful in imparting markedly improved flow to dip coatings.

10 Claims, No Drawings

WATER REDUCIBLE ACRYLIC WITH SUPERIOR DIP AND FLOW CHARACTERISTICS/LOW VOC

The present invention relates to curable compositions containing crosslinkable acrylic polymers. More specifically, the present invention relates to the acrylic polymers which by virtue of their method of preparation and functional groups impart to curable compositions desirable flow properties, particularly in their use as dip coatings.

BRIEF DESCRIPTION OF THE PRIOR ART

Dip coating compositions containing crosslinkable acrylic polymers are known in the art. One of the attendant problems of the dip coating application is non-uniformity of coated films, particularly at the edges of coated parts, and more so when the coated parts are held in an inclined or horizontal position. In part, it is believed that the non-uniformity is due to the rate of withdrawal of the parts from coating tanks and the inability of the coating to flow evenly before the coating is completely cured. The inadequate flow often results in uneven buildup of films around perforations in the parts or the edges of the parts and sealing of the perforations. This is manifested in poor appearance and defects such as blistering.

For a successful dip coating application, the applied coating must be able to flow evenly in order to provide uniform films. Acrylic polymers which are art-related are disclosed in U.S. Pat. No. 4,008,293, which describes crosslinkable acrylic polymers derived from an acrylamidoalkanesulfonic acid and their amino and ammonium salts interpolymerized with other ethylenically unsaturated monomers having independent hydroxy or carboxyl groups. The presence of the sulfonic acids or sulfonates seemingly accelerates the crosslinking reaction during baking of the coatings to cure. U.S. Pat. Application Ser. No. 07/102,210 (commonly assigned) now U.S. Pat. No. 4,873,281 discloses polymerization of ethylenically unsaturated monomers in the presence of a wax.

Heretofore, acrylic polymers by their nature and/or method of preparation have not been adapted to produce dip coating compositions having the requisite flow properties. The present invention provides such a crosslinkable acrylic polymer.

SUMMARY OF THE INVENTION

In accordance with the foregoing, the present invention encompasses an improved crosslinkable composition comprising a water-dispersible acrylic polymer, the improvement comprising the acrylic polymer which is prepared by copolymerizing ethylenically unsaturated monomers having independently an active hydrogen group, a sulfonic group, and a carboxy group; said acrylic polymer is prepared in the presence of a wax.

In the present embodiment of the invention, the sulfonic group is derived from acrylamidoalkanesulfonic acid monomers. The carboxyl group is derived from acrylic or methacrylic acids. In the preferred embodiment of the invention, relatively high amounts of the carboxylic group results in improvement in flow. The active hydrogen groups are typically hydroxy-functional monomers.

The acrylic polymers are employed in combination with crosslinking agents, such as aminoplasts, in order to produce the curable compositions of this invention. The curable compositions are particularly suited to use as dip coatings which have improved flow properties. When cured, the coatings give excellent appearance properties that are comparable to electrocoats.

DETAILED DESCRIPTION OF THE INVENTION

The acrylic polymers useful herein can be prepared by free-radical addition polymerization techniques of monomers described herein. The principal monomers useful herein are described more fully hereinbelow. The active hydrogen group-containing monomers are preferably hydroxy group-containing ethylenically unsaturated monomers containing active hydrogen groups. The ethylenically unsaturated monomers usually contain from about 2 to about 20 carbon atoms, preferably from about 3 to about 12 carbon atoms and more preferably from about 3 to about 8 carbon atoms. The active hydrogen-containing monomer can be employed in an amount of 3 to 30 and preferably 5 to 15 by weight based on total monomer content.

Examples of these monomers are hydroxy esters of ethylenically unsaturated acids such as 2-hydroxyethyl butyl maleate, 3-hydroxypropyl methyl maleate, 2-hydroxyethyl fumarate, 2-hydroxypropyl butyl fumarate, 3-hydroxypropyl butyl fumarate, bis-(2-hydroxyethyl) citacronate, bis-(2-hydroxyethyl) mesaconate and 2-hydroxyethyl vinylacetate. The acrylates and a-substituted acrylates are preferred. Examples include 1-hydroxyethyl acrylate, 2-hydroxyethyl acrylate, 1-hydroxypropyl acrylate, 2-hydroxypropyl acrylate, 3-hydroxypropyl acrylate, 2-hydroxy-1-methylethyl acrylate, 1-hydroxybutyl acrylate, 2-hydroxybutyl acrylate, 3-hydroxybutyl acrylate, 4-hydroxybutyl acrylate, 3-hydroxy-1-methylpropyl acrylate, 1-hydroxyethyl methacrylate, 2-hydroxyethyl methacrylate, 1-hydroxypropyl methacrylate, 2-hydroxypropyl methacrylate, 3-hydroxypropyl methacrylate, 1-hydroxybutyl methacrylate, 2-hydroxybutyl methacrylate, 3-hydroxybutyl methacrylate, 4-hydroxybutyl methacrylate, 2-hydroxyethyl a-chloroacrylate, 1-hydroxypropyl a-chloroacrylate, 2-hydroxypropyl a-chloroacrylate, 3-hydroxypropyl a-chloroacrylate, 3-hydroxybutyl a-chloroacrylate, 4-hydroxybutyl a-chloroacrylate, 1,1-dihydroxypropyl acrylate, 1,1-dihydroxypropyl methacrylate, and N-methyl-N-2-hydroxyethylaminoethyl acrylate.

Active hydrogen groups other than the hydroxyl groups can be employed. Examples thereof can be a mercapto group or an amino group. Illustrative examples of monomers containing other active hydrogen groups are vinylamine, allylamine, 2-aminoethyl acrylate, 2-aminopropyl acrylate, 2-methylaminoethyl acrylate, 2-mercaptoethyl acrylate, 3,5-dimercapto acrylate, 2-mercaptoethyl acrylate, and the like.

The ethylenically unsaturated monomer containing a carboxyl group can be acrylic acid, methacrylic acid, ethacrylic acid, a-chloroacrylic acid, vinylacetic acid, crotonic acid, tiglic acid, maleic acid, fumaric acid, aconitic acid, itaconic acid, citraconic acid, and mesaconic acid. Acrylic acid and methacrylic acid are preferred. The carboxyl group-containing ethylenically unsaturated monomer can be employed in an amount of about 5 to 50 and typically about 10 to 20 percent by weight solids based on the total weight of the monomers. In the presently preferred embodiments of the invention, the carboxyl group-containing monomer is in amounts greater than 10 percent and up to about 14 percent by weight. Relative to these amounts, it has been found that the acrylic polymers of this invention with a high acid group content imparts improved flow to curable compositions. It will, of course, be realized that too high a content may render the resultant coatings unduly water-sensitive.

The ethylenically unsaturated monomer containing a sulfonic group can be represented by the formula:

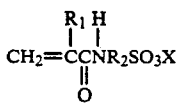

wherein $R_1$ is hydro, lower alkyl, lower cycloalkyl, phenyl, furyl, or halo; $R_2$ is a bivalent saturated hydrocarbon radical having its valence bonds on different carbon atoms, and X is hydro, ammonium or amine.

The preferred sulfonic group containing monomers are 2-acrylamido-2-methyl-1-propane sulfonic acid and its amine or ammonium salts. Generally, these and related monomers as to their nature and method of preparation are disclosed (U.S. Pat. No. 4,008,293 which is incorporated here by reference). An amount of about 0.2 to about 2.5 and preferably about 0.4 to about 1.0 percent by weight of the sulfonic group containing monomer monomer based on total monomer composition can be employed.

Other copolymerizable monomers that are useful herein can be esters of acrylic or methacrylic acid, e.g., methyl acrylate, methyl methacrylate, butyl acrylate; vinyl monomers, e.g., vinyl chloride, vinyl esters, e.g., vinyl acetate, vinyl aromatic compounds such as styrene; amides, such as acrylamides and methacrylamides and alkoxyalkyl derivatives, e.g., N-butoxymethylmethacrylamide.

It is a distinct feature of the invention that polymerization of the monomers are conducted in the presence of a wax. Suitable waxes include hydrocarbon and/or ester-containing waxes, e.g., petrolatum wax, bees wax, carnauba wax, polyethylene wax or a mixture thereof. An amount of about 1.0 to 15.0 percent by weight, preferably about 1 to 5 percent by weight of the wax based on resin solids can be employed.

Free-radical initiators which are employed herein can be the peroxides such as ethyl peroxide, benzoyl peroxide and dicumyl peroxide; ketone peroxides, such as methyl ethyl ketone peroxide; hydroperoxides such as methyl hydroperoxide, acyloins such as benzoin, alkali metal persulates, alkali metal bisulfites, peracetates such as methyl peracetate and tert-butyl peracetate, perbenzoates such as t-butylperbenzoate, peroxalates such as dimethyl peroxalate and di(tert-butyl) peroxalate, disulfides such as dimethyl thiuram disulfide and azo compounds such as a,a'azobisisobutyronitrile and y,y'-azobis(y-cyanovaleric acid). Typically, the free-radical initiator is employed in an amount of about 0.01 to 3 percent and preferably about 0.05 to 1 percent based on the weight of the copolymerizable monomers.

Chain transfer agents such as alkyl mercaptans, e.g., tertiary dodecyl mercaptan; ketones, such as methyl ethyl ketone and the like, can be employed.

The polymerization technique can be conducted in a solvent which is preferably a water-miscible solvent. Examples thereof can be monoalkyl ethers of ethylene glycol, ethylene glycol monohexyl ether, methylisobutyl ketone and the like. Typically, the reaction is conducted at an elevated temperature, usually at 120° C. to 150° C.

The resultant polymer can have a solids content of about 20 to about 40 and preferably about 25 to about 30 and weight average molecular weight of about 8,000 to about 25,000 and preferably about 10,000 to about 15,000 based on a polystyrene standard. The polymer is at least partially neutralized with a base which is preferably a fugitive base. Suitable bases include ammonia, primary, secondary or tertiary amines, e.g., ethanolamine, diethanolamine, N-methylethanolamine, dimethylethanolamine, methylamine, diethylamine, trimethylamine, morpholine and the like.

The curable compositions of this invention contain from about 10 to 80 percent and preferably about 50 to 70 percent by weight of the acrylic polymer in combination with a crosslinking agent in an amount sufficient to effect cure. The crosslinking agents can be aminoplasts, phenoplasts or isocyanates.

Aminoplast resins are the condensation products of an aldehyde, e.g., formaldehyde, acetaldehyde, crotonaldehyde, and benzaldehyde with an amino or amide group-containing substance, e.g., urea, melamine, and benzoguanamine. Products obtained from the reaction of alcohols and formaldehyde with melamine, urea or benzoguanamine are preferred in the aqueous-based coating compositions because of their good water dispersibility. Useful alcohols used to make the etherified products are the monohydric alcohols, such as methanol, ethanol, propanol, butanol, hexanol, benzyl alcohol, cyclohexanol, and ethoxyethanol. An etherified melamine-formaldehyde resin is the preferred aminoplast resin. U.S. Pat. No. 4,075,141, Porter et al, Feb. 21, 1978, contains a description of useful aminoplast resins and is incorporated herein by reference.

Phenolic resins include the condensation product of an aldehyde with a phenol. Formaldehyde and acetaldehyde are preferred aldehydes. Various phenols can be used, e.g., phenol per se, cresol, p-phenylphenol, p-tert-butylphenol, p-tert-amylphenol and cyclopentylphenol. The methylolphenol ethers described in U.S. Pat. No. 2,597,333 (herein incorporated by reference) are especially useful.

A number of blocked polyisocyanates are satisfactory crosslinking agents. These agents are well known in the art. Generally, the organic polyisocyanates are blocked with a volatile alcohol, epsilon-caprolactam or ketoxime. These blocked polyisocyanates become unblocked at elevated temperatures, e.g., above about 100° C. "The Chemistry of Organic Film Formers", Robert E. Kreiger Pub. Co., copyrighted 1977, by D. H. Solomon, pages 216–217, contains a description of many blocked isocyanates that can be used here. The disclosure of this publication is herein incorporated by reference.

Also contained in the coating compositions can be additives such as flow control agents, adhesion promoters, cure catalysts and the like. The coating compositions of this invention can be prepared by blending the acrylic polymer, the curing and other coating additives, and adjuncts thoroughly. The coatings can be cured by baking at temperatures sufficient to effect cure, e.g., from 300° F. to 500° F. to provide commercial quality coatings having uniform coating around perforations and edges, and altogether having an appearance which is comparable to an electrocoat. This and other aspects of the invention are further illustrated by the following non-limiting examples.

EXAMPLE 1

This example illustrates the method of preparing the acrylic polymer of this invention. The following was used in the preparation.

| Ingredients | Parts by Weight (grams) |
|---|---|
| Reactor Charge | |
| Butyl cellosolve | 282.8 |
| SHELLMAX wax[1] | 17.8 |
| MEKON wax[2] | 8.9 |
| Charge A Prime | |
| Deionized water | 12.0 |
| Butyl cellosolve | 25.0 |
| Acrylamidopropanesulfonic acid (AMPS) | 4.3 |
| Dimethylethanolamine | 1.9 |
| Charge X | |
| Butyl cellosolve | 24.7 |
| Tertiary butyl perbenzoate | 17.8 |
| Charge A | |
| Styrene | 236.8 |
| Butyl acrylate | 161.0 |
| Methyl methacrylate | 143.6 |
| Butyl methacrylate | 138.9 |
| Acrylic acid | 124.8 |
| Hydroxy propylacrylate | 82.8 |
| Tertiary dodecyl mercaptan | 8.9 |
| Charge B | |
| Butyl cellosolve | 3.3 |
| t-butyl perbenzoate | 1.9 |
| Charge C | |
| Butyl cellosolve | 3.3 |
| t-butyl perbenzoate | 1.9 |
| Charge D | |
| Butyl cellosolve | 3.3 |
| t-butyl perbenzoate | 1.9 |
| Rinse | |
| Butyl cellosolve | 15.0 |
| Charge E | |
| Dimethylethanolamine | 108.0 |
| Charge F | |
| Deionized water | 2108.0 |

[1] Hydrocarbon wax having a softening point of about 60° C.; it is available from Shell Oil Co.
[2] A micronized wax having a melting point of 201° F.; it is available from Petrolite Co..

In a reactor equipped with an agitator, a reflux condensor, thermometer, and a source of nitrogen, the reactor charge was heated to a temperature of 160° C. Upon reflux at 160° C., the nitrogen atmosphere was removed. At 163° F., addition of Charges A, A & X was commenced through separate channels The additions were conducted over a period of four hours. Upon completion of the addition of the above charges and at 130° F., Charge B was added, rinsed, and held for 1¾ hours. Upon completion of this addition and at 133° F, Charge C was added and the reaction mixture was held for 1¾ hours. Thereafter at 130° F., Charge D was added and the resultant mixture was held for 1¾ hours. The resultant mixture was measured for viscosity at a one-to-one ratio of the reaction mixture in N-methyl pyrrolidone (M-Pyrol). At 129° C., Charge E was added and the reaction mixture was held for 30 minutes. Thereafter, and over 100°–69° C., Charge F was added for over one hour. The resultant composition comprising the acrylic polymers of this invention was heated for two hours over a temperature range of 72° C. to 74° C., cooled and analyzed with the following results.

(Percent solids at 110° C. was 27.5 percent; milliequivalents of acid was 0.486; milliequivalents of base was 0.358; viscosity was 3340 centipoises (measured with a No. 5 spindle at 20 revolutions per minute (rpm)), and pH was 7.44.

A pigmented coating composition was prepared with an acrylic Polymer which was essentially the same as described above and a melamine curing agent. The coating composition was employed as a dip coating for parts. The coated parts were baked to cure. A markedly improved flow was exhibited and the cured coatings had excellent appearance.

Therefore, What is claimed is:

1. An improved crosslinkable water-dispersible acrylic polymer, the improvement comprising the acrylic polymer which is prepared by copolymerizing ethylenically unsaturated monomers including a monomer in an amount of 3 to 30 weight percent having an active hydrogen group, a monomer in an amount of 0.2 to 2.5 weight percent having a sulfonic group, and a monomer in an amount of 5 to 50 weight percent having a carbonyl group; wherein the copolymerization additionally includes about 1 to 15 weight percent of a wax.

2. The acrylic copolymer of claim 1 wherein the ethylenically unsaturated monomer having the active hydrogen group is a hydroxy-functional monomer selected from the group consisting of hydroxypropyl acrylate, hydroxypropyl methacrylate, hydroxyethyl acrylate, and hydroxyethyl methacrylate.

3. The acrylic copolymer of claim 1 wherein the ethylenically unsaturated monomer having carboxyl group is acrylic acid or methacrylic acid.

4. The acrylic copolymer of claim 1 wherein the monomer containing a carboxy group is in an amount of about 5 to about 50.

5. The acrylic copolymer of claim 4 wherein the monomer containing the carboxyl group is in an amount of about 10 to about 20.

6. The acrylic copolymer of claim 1 wherein the ethylenically unsaturated monomer containing a sulfonic group is represented by the formula:

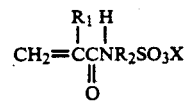

wherein $R_1$ is hydro, lower alkyl, lower cycloalkyl, phenyl, furyl, or halo; $R_2$ is a bivalent saturated hydrocarbon radical having its valence bonds on different carbon atoms, and X is hydro, ammonium or amine.

7. The acrylic copolymer of claim 6 wherein the ethylenically unsaturated monomer containing a sulfonic group is selected from 2-acrylamidopropanesulfonic acid.

8. The acrylic copolymer of claim 1 wherein the wax is a hydrocarbon wax.

9. A curable composition containing the acrylic copolymer of claim 1 and a curing agent selected from the group consisting of aminoplast, phenoplast, and an isocyanate.

10. The curable composition of 9 wherein the curing agent is a melamine resin.

* * * * *

UNITED STATES PATENT AND TRADEMARK OFFICE
CERTIFICATE OF CORRECTION

PATENT NO. : 5,034,454

DATED : July 23, 1991

INVENTOR(S) : Rudolf Maska et al.

It is certified that error appears in the above-identified patent and that said Letters Patent is hereby corrected as shown below:

Column 6, line 22, "carbonyl" should be --carboxy--.

Signed and Sealed this

Twenty-second Day of December, 1992

Attest:

DOUGLAS B. COMER

Attesting Officer     Acting Commissioner of Patents and Trademarks